May 14, 1957 H. J. MALACHOWSKI 2,791,939
MOUNT FOR A REAR VIEW MIRROR
Filed Aug. 31, 1954
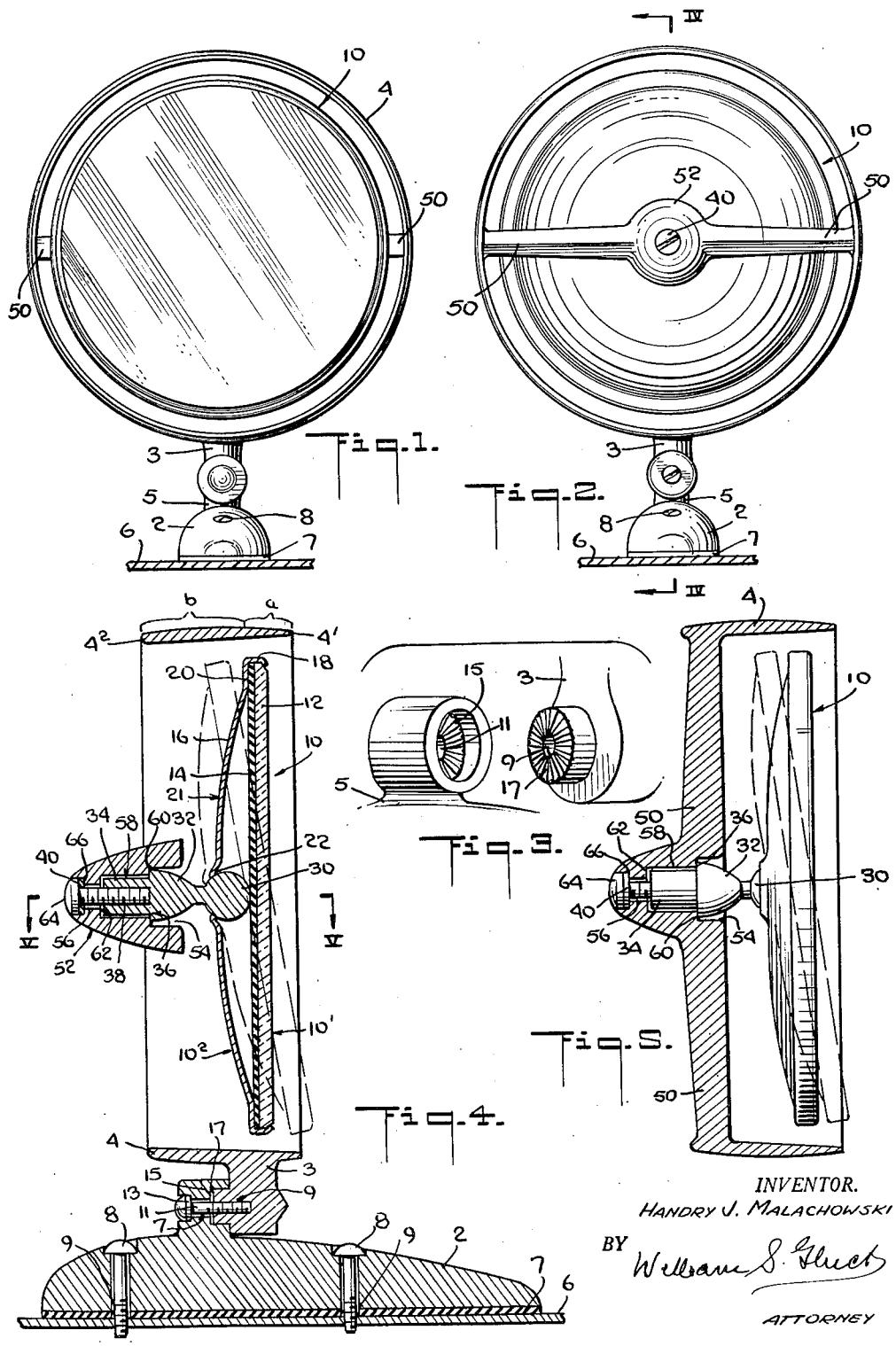
INVENTOR.
HANDRY J. MALACHOWSKI
BY William S. Gluck
ATTORNEY

United States Patent Office 2,791,939
Patented May 14, 1957

2,791,939

MOUNT FOR A REAR VIEW MIRROR

Handry J. Malachowski, Jersey City, N. J., assignor to Yankee Metal Products Corp., Norwalk, Conn., a corporation of New York Application August 31, 1954, Serial No. 453,313

1 Claim. (Cl. 88—98)

This invention relates to a mount for a rear view mirror for motor vehicles and the like.

A general object of this invention is the provision of a new and improved means for shielding such type mirror;

Another general object of this invention is the provision of a new and improved means for mounting the mirror and more particularly an arrangement whereunder the mount serves also as means for shielding the mirror.

One embodiment of the invention is illustrated in the drawings, wherein:

Fig. 1 is a front elevation of the mirror mount showing a mirror mounted therein;

Fig. 2 is a rear elevation of the device shown in Fig. 1;

Fig. 3 is a detailed exploded sectional view of the coarse adjustment means;

Fig. 4 is a sectional side view taken along line IV—IV of Fig. 2; and

Fig. 5 is a top view, partly in section, taken along line V—V of Fig. 4.

By reference to the drawings, it will be observed that a rear view mirror 10 of the type conventionally employed for vehicles and the like is shown located within a tubular section 4.

For convenience of reference, the reflecting face 10' of the mirror will hereinafter be referred to as its front face; its opposite face 10² as its rear face; edge 4' of tubular section 4 as its front edge and 4² as its rear edge.

The width of tubular section 4 is substantial and sufficient to permit the mirror to be supported therewithin with its light reflecting face 10' positioned substantially inwardly of the front edge 4' of tubular section 4. As a result, that portion of the length of the tubular section 4 which extends forwardly from the mirror serves as a light shield which cuts off fringe light not only from above but from all sides and for convenience of reference this width is marked in the drawings with a bracket and the letter A. This shielding portion sharpens the image seen in the mirror. It also shields the reflecting surface against falling rain, snow and the like and serves to protect the mirror against stone and other hazardous material projected by vehicle movement.

It will be observed from Figs. 2 and 4 of the drawings that the length of the tubular section 4 is such as to provide extension portion B beyond the mirror in the opposite direction to complete with the portion A protection of the mirror on opposite sides against breakage in handling or when dropped. It further serves as the base for rigidly mounting the mirror within the tubular section in the manner now to be set forth more in detail.

The mirror 10 is shown as comprised of the transparent section 12 made of glass, plastic or the like and the reflecting back 14, the two being held together by the encasement 16 whose edge portion 18 is bent to embrace both. This mirror assembly is supported from the extended portion of tubular section by intermediate means in the manner now to be pointed out: Extending inwardly from its outer edge portion are shown the spoke-like members 50 extending radially inwardly from the tubular section 4 to carry the centrally located hub 52 upon which the mirror 10 is adapted to be carried by means which will be set forth more fully hereinafter.

These spokes 50 serve to rigidify and strengthen the attachment of the mirror 10. Two of these spokes 50 are shown in the drawings and these spokes 50 are shown as being integral with tubular section 4, but it will be understood that it is within the scope of this invention to use more or less than the two spokes 50 shown and to mount the spokes 50 on the tubular section 4 in any manner desired. The hub 52 is shown as being integral with the spokes 50, but it will be understood that it is within the scope of the invention that the hub 52 be carried by spokes 50 in any desired manner. The mirror 10 is shown as being free to move on a pivot which is shown as a universal pivot. In the drawings, the universal pivot is shown as being comprised of the ball 30 and the socket opening 22 in the bracket 16. The bracket 16 has a portion 21 of its rear wall 20 spaced from the reflecting back 14 and the opening 22 is shown as located in this spaced portion 21 to form the socket for the ball 30.

In the drawings, the ball 30 is carried by a member 32 having the reduced portion 34 to form a shoulder 36. The member 32 has the threaded opening 38 therein to accommodate a screw 40. The hub 52 has the opening 54 therein which is comprised of the neck 56, the nose 58 on the front side of neck 56 to form shoulders 60 and 62, and the bore 64 on the rear side of neck 56 to form shoulder 66.

When the mirror 10 is to be mounted in the tubular section 4, the member 32 is placed into the opening 54 of hub 52 so that the shoulder 36 abuts shoulder 60 and the reduced portion 34 enters the bore 58 to abut shoulder 62. The screw 40 is entered through bore 54, and neck 56 to engage the threaded opening 38 of the member 32 and hold the member 32 in the hub 52. The hub 52 is shown as protruding from the rear of the tubular section 4 to expose the screw 40 for ease in assembling the mirror 10 on the mount. The spokes 50 and the forward edges 70 of hub 52 act as limit stops to limit the swing of the mirror 10 on the universal pivot 30–22 so that the mirror 10 will remain within the metes and bounds of the tubular section 4. The mirror 10 is shown as spaced from the tubular section 4 to reduce wind pressure on the mirror 10.

The mirror 10 and tubular section 4 are shown in the drawings as being circular for the added advantages which will be more fully set forth below, but it will be understood that it is within the scope of this invention to make the mirror 10 and tubular section 4 of any desired shape. The tubular section 4 is shown as being pivotally mounted on the pedestal 2. The pivot mounting is shown in the drawings as being accomplished by providing an upstanding journal 3 on the pedestal 2 and a downwardly positioned journal 5 on the tubular section 4. The journal 3 has opening 7 therein and the journal 5 has the threaded opening 9 therein and both journals 3 and 5 are provided with serrations 15 and 17 which are adapted to interfit each other. The screw 11 is adapted to enter the openings 7 and 9 to hold the tubular section 4 and pedestal 2 together and to provide a pivot for the tubular section 4. The pivot for the tubular section 4 is shown as parallel to the pivot of the mirror 10. The pedestal 2 is adapted to be mounted on the body 6 of an automobile (not shown) in any desired manner, e. g. by the screws 8 shown in the drawings. The backing piece 7, having openings 9 for the screws 8, is provided to prevent any damage to the body 6 of the automobile. When the tubular section 4 is to be pivoted on the pedestal 2, the screw 11 is loosened, the tubular section 4 is pivoted to the desired position, and the screw 11 is tightened. The serrations 15 and 17 will lock with each other to prevent accidental movement of the tubular section 4. Thus the pivot 11 provides a coarse adjustment for the mirror 10 and the pivot 30 provides a fine adjustment for mirror 10.

The mirror 10 is thus protected from any damage due to the fact that any shocks, whether from the front or rear will be absorbed by the encasement 4. Fringe light which may glare the driver's vision is cut off because of the inset position of the mirror 10 from the front of the encasement 4. Wind pressure will be minimized because of the spacing between the edge of the mirror 10 and the encasement 4. The spokes 50 strengthen and rigidify the encasement 4 and also serve to strengthen and rigidify the mirror 10 and act as shock absorbers.

I claim:

A vehicle attachable annular shield and a rear view mirror supported therewithin and diametrically thereof, the bore of said annular shield being open at both ends and uniform throughout its length and of a length substantially greater than the thickness of the mirror and of greater cross section than that of the mirror and means for supporting said mirror centrally within the shield with its reflecting surface exposed to the rear and displaced inwardly of its opposite open ends and with its rims spaced inwardly of the inner surface of the shield, said supporting means comprising a socket member supported axially of and extending inwardly into said bore and radially extending arms each mounted at one end on the rim edge of the shield and secured at the other end to said socket member.

References Cited in the file of this patent

UNITED STATES PATENTS

| | | |
|---|---|---|
| 1,506,727 | Rampp | Aug. 26, 1924 |
| 1,844,675 | Oishei et al. | Feb. 9, 1932 |
| 1,848,064 | Oishei | Mar. 1, 1932 |
| 2,408,495 | Wager | Oct. 1, 1946 |
| 2,457,348 | Chambers | Dec. 28, 1948 |
| 2,533,475 | Koonter | Dec. 12, 1950 |
| 2,534,135 | Lahr et al. | Dec. 12, 1950 |
| 2,604,818 | Morgenstern | July 29, 1952 |
| 2,696,142 | Langford | Dec. 7, 1954 |

FOREIGN PATENTS

| | | |
|---|---|---|
| 667,227 | Germany | Nov. 7, 1938 |
| 915,538 | Germany | July 22, 1954 |